(12) United States Patent
Boger

(10) Patent No.: US 6,917,858 B2
(45) Date of Patent: Jul. 12, 2005

(54) FLUID REGULATION

(75) Inventor: Henry W. Boger, Foxboro, MA (US)

(73) Assignee: Dresser, Inc., Addison, TX (US)

( * ) Notice: Subject to any disclaimer, the term of this patent is extended or adjusted under 35 U.S.C. 154(b) by 130 days.

(21) Appl. No.: 10/651,396

(22) Filed: Aug. 29, 2003

(65) Prior Publication Data

US 2005/0049755 A1 Mar. 3, 2005

(51) Int. Cl.$^7$ .................................................. G05D 7/00
(52) U.S. Cl. ......................... 700/282; 700/282; 251/12; 137/315.03
(58) Field of Search ................................. 700/275, 281, 700/282; 137/487, 485, 315.03; 251/25, 12

(56) References Cited

U.S. PATENT DOCUMENTS

| | | | |
|---|---|---|---|
| 2,991,652 A | 7/1961 | Bassett | |
| 3,555,902 A | 1/1971 | Onoda et al. | |
| 3,599,022 A | 8/1971 | Adair | |
| 3,685,353 A | 8/1972 | Gestler et al. | |
| 3,772,917 A | 11/1973 | Lutz et al. | |
| 3,811,465 A | 5/1974 | Abbey | |
| 4,005,319 A | 1/1977 | Nilsson et al. | |
| 4,150,314 A | 4/1979 | Zabler et al. | |
| 4,247,601 A | 1/1981 | Wiegand | |
| 4,263,523 A | 4/1981 | Wiegand | |
| 4,265,127 A | 5/1981 | Onoda | |
| 4,409,848 A | 10/1983 | Lutz | |
| 4,593,209 A | 6/1986 | Sloan | |
| 4,736,122 A | 4/1988 | Opie et al. | |
| 4,743,780 A | 5/1988 | Opie | |
| 4,758,742 A | 7/1988 | Opie | |
| 4,793,192 A | 12/1988 | Jerger et al. | |
| 4,992,027 A | 2/1991 | Acosta | |
| 5,114,070 A | 5/1992 | Lilja et al. | |
| 5,199,307 A | 4/1993 | Onoda et al. | |
| 5,359,942 A | 11/1994 | Ward | |
| 5,517,464 A | 5/1996 | Lerner et al. | |
| 5,573,032 A | 11/1996 | Lenz et al. | |
| 5,576,486 A | 11/1996 | Paz | |
| 5,654,885 A | * 8/1997 | Mayhew et al. | ............ 700/282 |
| 5,931,180 A | * 8/1999 | Nagasaka | ..................... 137/85 |
| 5,965,964 A | 10/1999 | Skinner et al. | |
| 6,186,167 B1 | * 2/2001 | Grumstrup et al. | ...... 137/487.5 |
| 6,191,687 B1 | 2/2001 | Dlugos et al. | |
| 6,236,185 B1 | 5/2001 | Hines et al. | |
| 6,272,401 B1 | 8/2001 | Boger et al. | |
| 6,463,950 B1 | 10/2002 | Staniczek | |
| 6,481,634 B1 | 11/2002 | Zosimadis | |
| 6,519,508 B1 | * 2/2003 | Saito | .......................... 700/282 |
| 6,554,074 B2 | 4/2003 | Longbottom | |
| 6,581,619 B1 | 6/2003 | Christiani et al. | |
| 2002/0083778 A1 | 7/2002 | Hamilton | |
| 2002/0148648 A1 | 10/2002 | Schultz et al. | |
| 2003/0043052 A1 | 3/2003 | Tapperson et al. | |

FOREIGN PATENT DOCUMENTS

| | | |
|---|---|---|
| EP | 1204011 | 5/2002 |
| WO | WO 00/79164 | 12/2000 |

* cited by examiner

*Primary Examiner*—Jayprakash N. Gandhl
(74) *Attorney, Agent, or Firm*—Fish & Richardson P.C.

(57) ABSTRACT

Fluid regulation may be achieved by a process performed by a controller. The process may include regulating a first fluid with a fluid-driven fluid regulator, receiving a second fluid, receiving electric power generated using the second fluid, and controlling the fluid regulator with the second fluid. The process may also include determining whether wirelessly sent instructions regarding regulation have been received and, if wirelessly sent instructions regarding regulation have been received, adjusting control of the fluid regulator.

27 Claims, 3 Drawing Sheets

FLUID REGULATION

TECHNICAL FIELD

This description relates to fluids, and more particularly to systems and techniques for fluid regulation.

BACKGROUND

Valves are used to regulate fluid flow in a wide variety of commercial and industrial applications. For example, valves are used to regulate steam in the pipes of nuclear power plants, water in the pipes of water supply systems, and air in the ducts of air conditioning systems.

Valves are typically controlled manually and/or electronically. Electronically controlled valves often receive command signals through a set of wires. The power needed to run the positioner of a valve may be derived from the command signals or delivered through a separate set of wires.

SUMMARY

The present description relates to systems and techniques for fluid regulation. In one general aspect, a system for fluid regulation may include a fluid-driven fluid regulator operable to regulate a first fluid, a fluid supply line operable to supply a second fluid, and a controller coupled to the supply line and to the fluid regulator, the controller operable to control the fluid regulator using fluid from the supply line. The fluid regulator may, for example, be a pneumatically-actuated valve. The system may also include a wireless transceiver coupled to the controller, and an electric power generator coupled to the supply line and the controller. The wireless transceiver may be operable to wirelessly receive instructions regarding fluid regulation, and the electric power generator may be operable to generate electric power for the controller and the wireless transceiver using fluid from the supply line. The wireless transceiver may, for example, be a radio frequency transceiver, and the electric power generator may, for example, be an air-powered turbine that generates current.

In certain implementations, the controller may include a relay coupled to the supply line and the fluid regulator and a microprocessor coupled to the electric power generator to receive electric power therefrom. The relay may be controllable to provide fluid from the supply line to the fluid regulator, and the microprocessor may be operable to control the relay.

Particular implementations may include a fluid output conduit coupled to the fluid regulator, and a sensor coupled to the fluid output conduit and the controller. The fluid output conduit may transport the regulated first fluid, and the sensor may be operable to detect a property of the fluid in the fluid output conduit and to generate a signal representative of the property. The sensor may, for example, be a temperature sensor.

In certain implementations, the controller may be further operable to generate a wireless message including a representation of the signal, and the wireless transceiver may be further operable to wirelessly send the wireless message.

In some implementations, the electric power generator includes a current generator and a pressure regulator. The pressure regulator may be coupled in parallel with the current generator to the fluid supply line and supply more fluid to the controller when the fluid regulator is adjusting.

Particular implementations may include a fluid intake conduit coupled to the fluid regulator. The fluid supply line may be coupled to the fluid intake conduit.

In another general aspect, a system for fluid regulation may include a fluid-driven fluid regulator operable to regulate a first fluid, a fluid inlet port for a second fluid, and a controller coupled the inlet port and to the fluid regulator, the controller operable to control the fluid regulator with fluid from the inlet port and to receive electric power from an electric power generator coupled to a fluid supply line that feeds the fluid inlet port. The system may also include a wireless transceiver coupled to the controller, the transceiver operable to wirelessly receive instructions regarding fluid regulation.

Particular implementations may include a fluid output conduit coupled to the fluid regulator and a sensor coupled to the fluid output conduit and the controller. The fluid output conduit may transport the regulated first fluid, and the sensor may be operable to detect a property of the fluid in the fluid output conduit and to generate a signal representative of the property.

Certain implementations may include the electric power generator. The electric power generator may be coupled to the controller and operable to generate electric power for the controller using fluid in a supply line that feeds the inlet port. The electric power generator may include a current generator and a pressure regulator. The pressure regulator may be coupled in parallel with the current generator to a fluid supply line that feeds the inlet port and supply more fluid to the controller when the fluid regulator is adjusting. Some implementations may include the fluid supply line.

In another general aspect, a method for fluid regulation may include regulating a first fluid with a fluid-driven fluid regulator, receiving a second fluid, receiving electric power generated using the second fluid, and controlling the fluid regulator with the second fluid. The second fluid may, for example, be air. The method may also include determining whether wirelessly sent instructions regarding regulation have been received and, if wirelessly sent instructions regarding regulation have been received, adjusting control of the fluid regulator.

Particular implementations may include receiving a signal representative of a property of the regulated first fluid. Some implementations may include generating a wireless message including a representation of the generated signal. Furthermore, some implementations may include detecting a property of the regulated first fluid and generating the signal representative of the property.

Certain implementations may include receiving more second fluid when the fluid regulator is adjusting.

In yet another general aspect, a system for fluid flow regulation may include means for regulating a first fluid, means for receiving a second fluid, and means for controlling the regulation means with the second fluid. The system may also include means for wirelessly receiving instructions regarding fluid regulation and means for generating electric power for the controlling means using the second fluid.

In certain implementations, the controlling means may be further operable to receive a signal representative of a property of the regulated first fluid and to generate a wireless message including a representation of the generated signal. The wireless receiving means may be further operable to send the wireless message. Particular implementations may include means for detecting a property of the regulated first fluid and for generating the signal representative of the property.

Some implementations may include means for supplying more second fluid when the regulation means is adjusting.

In another general aspect, a system for fluid regulation may include a fluid intake conduit, a fluid output conduit, a pneumatically-actuated valve coupled between the fluid intake conduit and the fluid output conduit, and a pneumatic supply line. The system may also include a flow meter coupled to the fluid output conduit and the controller, the flow meter operable to detect flow of the first fluid in the fluid output conduit and to generate signals representative thereof. The system may additionally include a controller coupled to the supply line and to the valve, the controller operable to control the valve. The controller may include a relay coupled between the supply line and the valve, a current-to-pressure transducer coupled to the relay, and a microprocessor coupled to the transducer. The relay may be operable to controllably supply fluid from the supply line to the valve, the transducer may be operable to control the relay, and the microprocessor may be operable to control the transducer based on the signals from the flow meter. The system may also include a wireless transceiver coupled to the controller. The transceiver may be operable to wirelessly receive instructions regarding fluid regulation and wirelessly send messages including representations of the flow meter signals. The system may additionally include an electric power generator coupled to the supply line. The electric power generator may include a pneumatic turbine and a pressure regulator. The turbine may be operable to generate electric power for the controller and the wireless transceiver using fluid from the supply line, and the pressure regulator may be coupled in parallel with turbine to the supply line and supply more fluid to the controller when the valve is stroking.

The systems and techniques have a variety of features. For example, in certain implementations, electric power does not have to be remotely supplied to the controller, as the electric power may be generated locally using a supplied fluid. The ability to generate power locally allows the controller to be installed in locations where wiring is difficult. Moreover, even if wiring is not difficult, the cost and time of doing so may be avoided. As another example, in particular implementations, information may be communicated wirelessly to and/or from the controller. Thus, again, no wires have to be connected thereto. This allows the controller to be used in remote locations and/or locations that are not easily accessible by humans. Different implementations, however, may posses none, one, some, or all of these features and/or additional features.

The details of one or more implementations are set forth in the accompanying drawings and the description below. Other features will be apparent from the description and drawings, and from the claims.

BRIEF DESCRIPTION OF DRAWINGS

Like reference symbols in the various drawings indicate like elements.

DETAILED DESCRIPTION

Fluid regulation may be achieved by a controller that controls a pneumatically-actuated valve by receiving wirelessly transmitted instructions regarding regulation, sensor readings regarding the regulated fluid, and electric power generated by an electric power generator coupled to a pneumatic supply line. The regulated fluid may be regulated based on its pressure, temperature, flow rate, level, or any other appropriate property. Fluid regulation may, however, be achieved by a variety of other systems and techniques.

Figure 1:
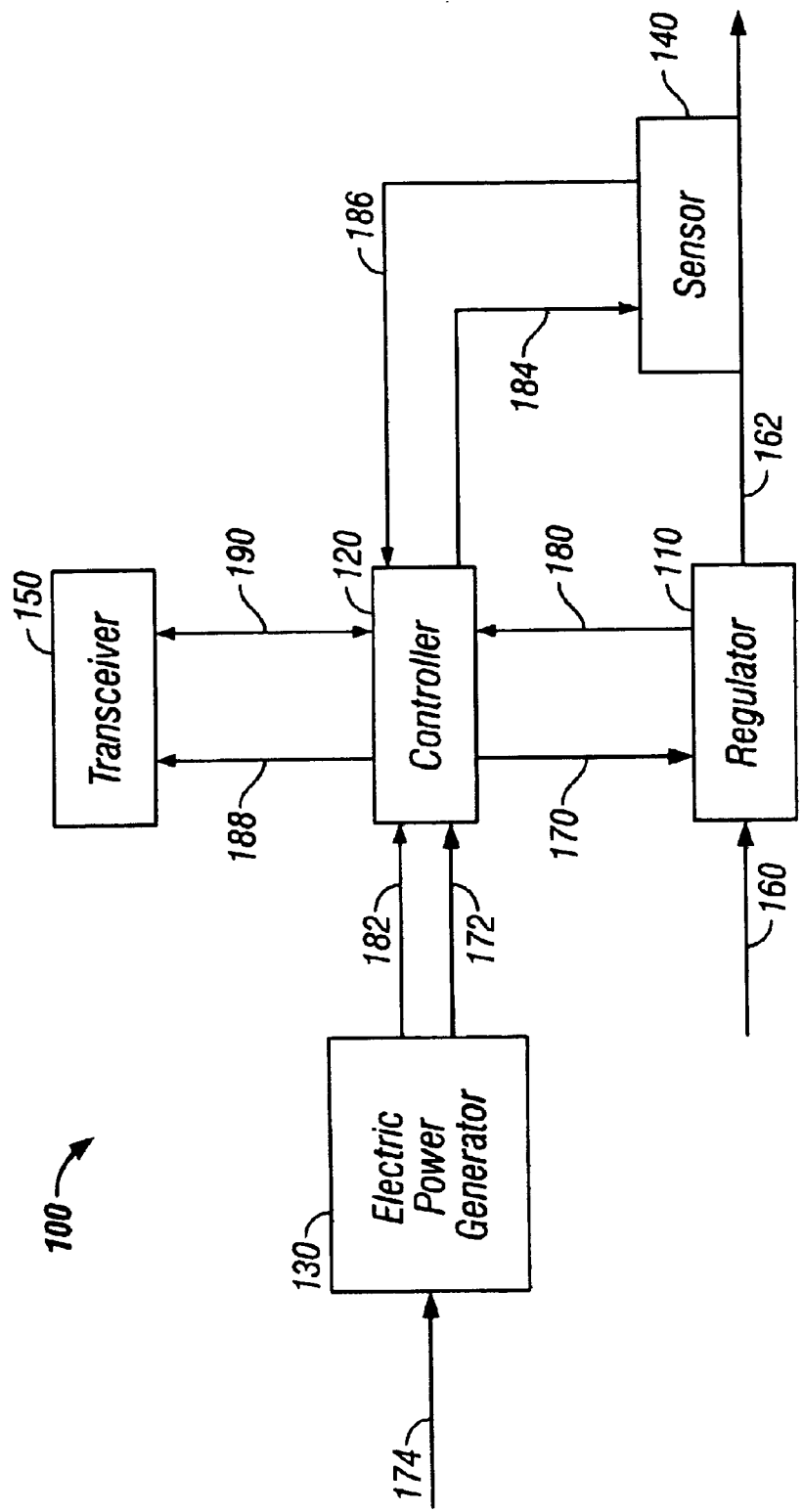
FIG. 1 is a block diagram illustrating a system for fluid regulation.

FIG. 1 illustrates a system 100 for fluid regulation. System 100 includes a fluid-driven fluid regulator 110, a controller 120, an electric power generator 130, a sensor 140, and a wireless transceiver 150. Fluid regulator 110 is responsible for regulating a fluid, and controller 120 is responsible for controlling fluid regulation by fluid regulator 110. That is, fluid regulator 110 regulates fluid under the control of controller 120. Controller 120, sensor 140, and wireless transceiver 150 receive electric power from electric power generator 130. Sensor 140 detects a property of the regulated fluid and sends a signal representative of the property to controller 120. Controller 120 may use this signal to adjust control of fluid regulator 110 and/or generate a wireless message that wireless transceiver 150 wirelessly sends. Wireless transceiver 150 may also wirelessly receive instructions for controller 120.

In more detail, fluid regulator 110 may be any type of device that regulates a property of a fluid. For example, fluid regulator 110 may regulate the flow of a fluid. In these implementations, fluid regulator 110 may be a valve. Fluid regulator 110, however, may regulate any other appropriate property of the fluid.

Fluid regulator 110 is coupled to a fluid intake conduit 160 and a fluid output conduit 162. Fluid intake conduit 160 and fluid output conduit 162 may, for example, be pipes. Fluid intake conduit 160 delivers the fluid to be regulated, and fluid output conduit 162 transports the fluid after it has been regulated. The fluid to be regulated may be in liquid, gaseous, and/or any other appropriate form. In certain implementations, fluid intake conduit 160 and fluid output conduit 162 may be part of fluid regulator 110 and, hence, may be integrally coupled thereto.

Fluid regulator 110 is coupled to controller 120 by a fluid supply line 170 and a feedback line 180. Fluid supply line 170 supplies the fluid that drives fluid regulator 110. Fluid supply line 170 may supply air, natural gas, or any other appropriate fluid for driving fluid regulator 110. Feedback line 180 carries information regarding the operations of the fluid regulator 110. For example, a throttling position of fluid regulator 110 may be relayed to controller 120 by feedback line 180. Feedback line 180 may, for example, be a serial communication bus, such as, for example, as RS-232 bus.

Controller 120 includes a logical device for determining how to drive fluid regulator 110 and an actuator for supplying fluid to fluid supply line 170. For example, controller 120 may include a logical device such as a digital computer or a proportional-integral-derivative (PID) controller for determining how to drive fluid regulator 110. The logical device may operate according to a set point, which may be received through wireless transceiver 150. Controller 120 may include a communication board to communicate with the wireless transceiver 150. Appropriate communication boards are available from National Instruments of Austin, Tex. As another example, controller 120 may include a spool valve that is controlled by the logical device to supply the fluid to fluid supply line 170. The logical device may use the feedback information received through feedback line 180 to control the actuator. For example, if regulator 110 is supposed to achieve a certain throttling position, but the information received through the feedback line indicates that the regulator is not at that position, the controller may instruct the actuator to adjust the amount of fluid supplied to fluid regulator 110 through fluid supply line 170. In certain implementations, the controller may generate wireless messages when the fluid regulator is not behaving properly. The wireless messages may be wirelessly sent to a monitoring facility by wireless transceiver 150.

Controller 120 is also coupled to a fluid supply line 172 and an electric power supply line 182. Controller 120 receives fluid for supply to fluid supply line 170 through fluid supply line 172 and receives electric power for operating the logical unit and the actuator through electric power supply line 182. Controller 120 may have a fluid inlet port for coupling to fluid supply line 172. The fluid inlet port may, for example, be a one-quarter inch National Pipe Thread connector.

Also coupled to fluid supply line 172 and electric power supply line 182 is electric power generator 130. Furthermore, electric power generator 130 is coupled to a fluid supply line 174.

Electric power generator 130 includes a transducer for converting fluid energy in fluid supply line 174 into electric power. The transducer may, for example, be an air-driven turbine alternator or an oscillating piston utilizing moving magnets and fixed coils. After generating electric power from the fluid in supply line 174, electric power generator delivers the electric power through electric power supply line 182 and the remaining fluid from supply line 174 through fluid supply line 172 to controller 120.

Controller 120 supplies some of the power from electric power generator 130 to sensor 140 using an electric power supply line 184. Sensor 140 uses the electric power to detect any appropriate property of the regulated fluid (i.e., the fluid in fluid output conduit 162). For example, sensor 140 may detect the temperature, pressure, flow rate, or level of the regulated fluid. Sensor 140 may be external to fluid output conduit 162, internal to fluid output conduit 162, or partially internal to and partially external to fluid output conduit 162. In general, sensor 140 may be any appropriate type of process transmitter.

Sensor 140 is also coupled to controller 120 by a feedback line 186. Using feedback line 186, sensor 140 may relay a information representative of a detected property to controller 120. Feedback line 186 may, for example, be a mechanical linkage (e.g., rotary or linear) or an electric line (e.g., an RS-232 bus). If feedback line 186 is a mechanical linkage, the controller may use a sensor (e.g., a Hall-effect sensor) to convert the mechanical movement into an electric signal.

Controller 120 also supplies some of the power from electric power generator 130 to a wireless transceiver 150 through an electric power supply line 182. When powered, wireless transceiver 150 is operable to send communications to and receive communications from a central station, another fluid regulation system, or any other appropriate wireless device. The communications may include representations of the sensor detections, status information regarding the controller, the regulator, the electric power generator, the sensor, and/or the wireless transceiver, and/or instructions for the controller. The wireless transceiver may operate using radio frequency (RF), infrared (IR), or any other appropriate technique. In particular implementations, the wireless transceiver may be a low-power, spread-spectrum RF transceiver.

In one mode of operation, electric power generator 130 is receiving fluid through fluid supply line 174 in a steady state. Thus, electric power generator 130 may continuously generate electric power and supply the electric power and the remaining fluid to controller 120 through electric power supply line 182 and fluid supply line 172, respectively.

Controller 120 uses the received electric power and fluid in controlling fluid regulator 110. Using the received electric power and the information received through feedback line 180, controller 120 determines whether fluid regulator 110 is operating appropriately (e.g., allowing an appropriate amount of fluid to pass). For example, if fluid regulator 110 is not operating appropriately and requires more fluid, controller 120 may supply some of the fluid received through fluid supply line 172 to fluid regulator 110 through fluid supply line 170. The controller may make such determinations many times per second.

Controller 120 is also receiving information regarding a property of the regulated fluid from sensor 140. Using this information, controller 120 may determine whether to adjust the control of the fluid regulator. For example, if controller 120 desires a certain amount of fluid to be passing through fluid regulator 110, but the information from sensor 140 indicates that a larger amount of fluid is passing through fluid output conduit 162, controller 120 may drive fluid regulator 110 to restrict the amount of fluid flowing therethrough. Controller 120 is also generating wireless messages that represent the fluid property and sending them to wireless transceiver 150 for transmission to a central monitoring facility.

Wireless transceiver 150 also receives instructions for controller 120. The instructions may arrive periodically, aperiodically, in response to a request from controller 120, or otherwise. The instructions may request the controller to send information regarding the status of the controller, fluid regulator 110, electric power generator 130, sensor 140, and/or wireless transceiver 150. Furthermore, the instructions may request controller 120 to control regulator fluid in a new manner. For example, the instructions may specify a flow rate or flow level (i.e., a set point) for the regulated fluid. Controller 120 may then adjust control of fluid regulator 110 appropriately.

System 100 has a variety of features. For example, electric power does not have to be supplied to the system as it can generate electric power for itself. For instance, the power requirements for a controller may be approximately 40 mW, the power requirements for a sensor may be approximately 40 mW, and the power requirements for a wireless transceiver may be approximately 1 W while transmitting and far less while receiving. Thus, a current generator having the capability to generator around 500 mW should be able to meet these power requirements. Assuming supply line 174 provides compressed air with a header pressure of 60 psig, and a reduced supply pressure required at the controller of 30 psig, the available energy should be approximately 500 mW at a flow rate of 0.20 scfm with only a 10% conversion efficiency. The ability to generate its own power allows the system to be installed in locations where wiring is difficult. Moreover, even if wiring is not difficult, the cost and time of doing so may be avoided.

As another example, system 100 allows information to be communicated wirelessly to and from the controller. Thus, again, no wires have to be connected thereto. This allows the system to be used in remote locations and/or locations that are not easily accessible by humans.

Although
FIG. 1 illustrates a system for fluid regulation,
other systems for fluid regulation may have fewer, additional, and/or a different arrangement of components.

For example, a system may not include a sensor and/or a wireless transceiver. On the other hand, a system may include an additional sensor (e.g., to sense fluid properties in the fluid intake conduit or to sense other fluid properties in the fluid output conduit). As another example, the controller and the fluid regulator may be incorporated into a housing. Furthermore, the wireless transceiver may also be incorporated into the housing. Moreover, the wireless transceiver may be incorporated into the controller. As a further example, some or all of the electric power lines and the information lines may be merged. For instance, power may be conveyed through the same lines that carry the information. As another example, some of the power lines may be eliminated. Sensor 140, for example, may not need electric power if it is a piezo-electric pressure transducer. As an additional example, the system may include a battery backup.

Figure 2:
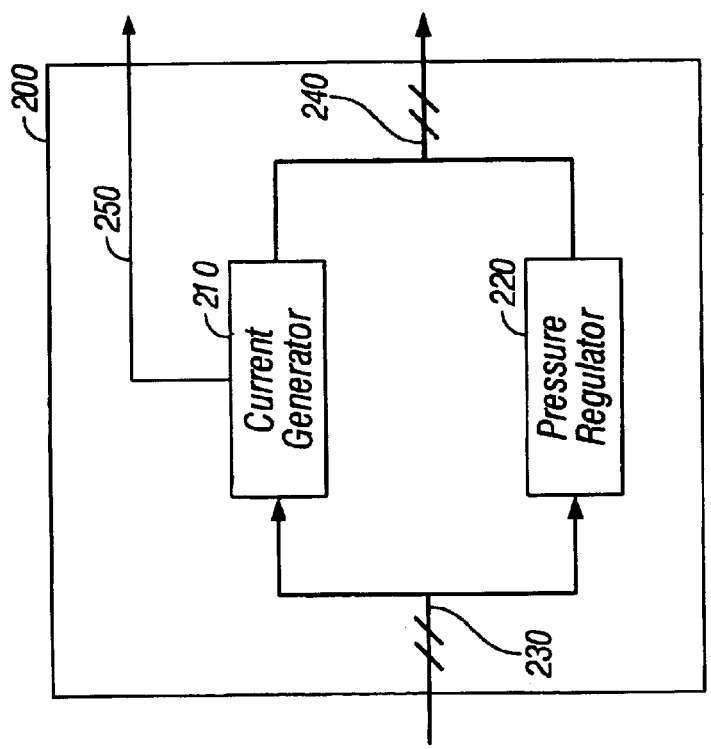
FIG. 2 is a block diagram illustrating an electric power generator for the system in FIG. 1.

FIG. 2 illustrates an electric power generator 200 for system 100. Electric power generator 200, however, could also be used for other fluid regulation systems.

Electric power generator 200 includes a current generator 210, a pressure regulator 220, an input air line 230, an output air line 240, and an output electric line 250. Current generator 210 is operable to generate current using air in input air line 230 and to discharge air into output air line 240, for conveyance to the controller. Current generator 210 may operate off of a relatively low amount of air. For example, current generator 210 may operate off of the air consumed by the controller other than when the controller is causing the regulator to operate. The current is sent through output electric line 250 to the controller.

Pressure regulator 220 also receives air from input air line 230. Pressure regulator 220 is responsible for maintaining a fairly constant pressure in output air line 240. Thus, if the controller is just consuming as much air as is used to power current generator 210, pressure regulator 240 may allow little, if any, air through. However, if the controller is causing the regulator to adjust (e.g., stroke), which would probably cause an increase in air consumption, pressure regulator 240 may increase the amount of air flowing through the electric power generator. Pressure regulator 220 may, for example, be an airset.

Figure 3:
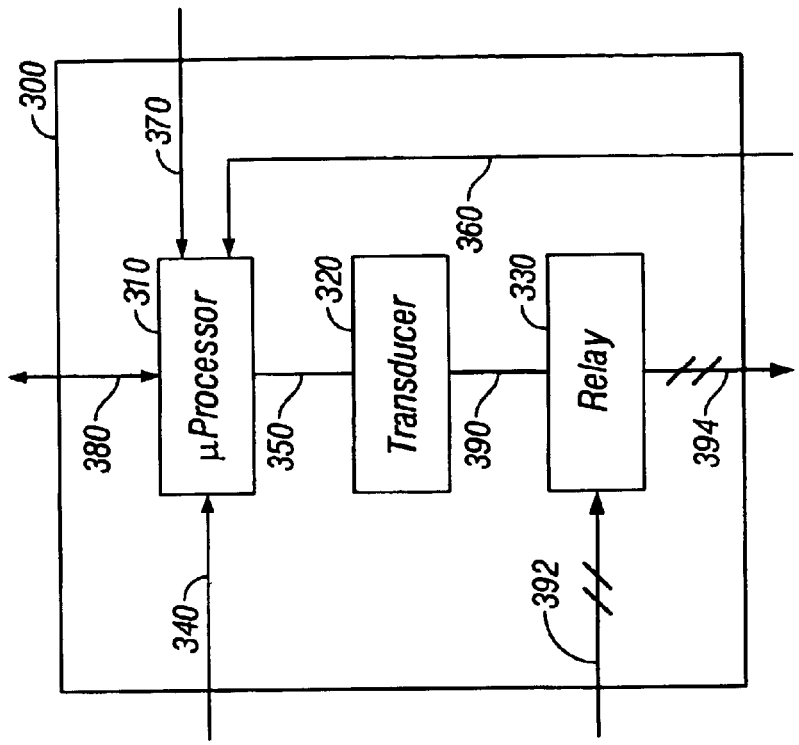
FIG. 3 is a block diagram illustrating a controller for the system in FIG. 1.

FIG. 3 illustrates a controller 300 for system 100. Controller 300, however, could also be used for other fluid regulation systems.

Controller 300 includes a microprocessor 310, a current-to-pressure transducer 320, and a relay 330. In operation, microprocessor 310 is operable to control transducer 320. Transducer 320, in turn, is operable to control relay 330, which controls the amount of air supplied to the fluid regulator.

In more detail, microprocessor 310 may be a complex instruction-set computer (CISC), a reduced instruction set computer (RISC), or any other type of digital device that logically manipulates information. Microprocessor 310 may, for example, be a Motorola HC11. Microprocessor 310 is operable to receive power through an electric power delivery line 340, the power from the line powering the microprocessor. Furthermore, as mentioned previously, the microprocessor is operable to control transducer 320. To accomplish this, microprocessor 310 sends signals through a line 350. Additionally, microprocessor 310 is operable to receive information from the fluid regulator through a feedback line 360 and to receive information representing a property of a regulated fluid from the sensor through a feedback line 370. Furthermore, microprocessor 310 is operable to generate messages for wireless transmission and send them to the wireless transceiver through a line 380 and to receive wirelessly sent messages from the wireless transceiver through line 380.

In operation, microprocessor 310 is operable to control transducer 320. Transducer 320, in turn, controls relay 330, which controls the air flow to the fluid regulator. Thus, the microprocessor is operable to control the fluid regulator. The microprocessor may control the fluid regulator based on the feedback from the fluid regulator, the detections by the sensor, and/or the messages received through the wireless transceiver.

Transducer 320 converts the electrical signals received from microprocessor 310 through line 350 into pressure. The pressure is output to relay 330 through line 390, which may very short in length. Transducer 320 may be any appropriate type of device for converting electrical signals into pressure.

In particular implementations, transducer 320 may produce a pneumatic pressure proportional to a given electrical current. Such a transducer may use a flexure-nozzle arrangement. The flexure assembly may include a cantilevered flexure integrally secured to a molded spring support, a first bias spring positioned on a first side of the flexure, and a second bias spring positioned on a second of the flexure. The flexure, which is a flat strip of magnetic material, the molded spring support, and the bias springs are centered around a nozzle of the transducer, and the thickness of the flexure is locally reduced in an area not integrated into the molded spring support. The flexure is acted on by a variable magnetic force produced by a current flow though a wire coil, thereby creating a back pressure in the nozzle.

Because the flexure is cantilevered, the flexure may expand and contract perpendicular to the nozzle, thereby maintaining a constant distance between the flexure and the nozzle under a wide temperature range. In addition, the molded spring support maintains a correct alignment of the bias springs, which are used to set the zero condition of the transducer and further enhance the strength of the flexure assembly. The bias springs also increase the stiffness of the entire flexure assembly, and a stiff flexure assembly should have a high natural frequency and, hence, greater vibration resistance. A transducer having such a design may have a predetermined temperature and vibration resistance for the flexure.

Relay 330 detects the pressure from transducer 320 through line 390 and, according to the pressure, adjusts the amount of air from an input air line 392 to an output air line 394. By adjusting the amount of air to the output air line, the fluid regulator is controlled. Relay 330 may be any appropriate type of device for amplifying the flow capacity and pressure range of the output flow.

In particular implementations, relay 330 may be dynamically balanced so as to alleviate flow deadband, in which input pressure from a device such as current-to-pressure transducer 320 changes with no corresponding change in output flow. A dynamically balanced relay may include a balance plug, a supply plug positioned on top of the balance plug, a bead chain connecting the balance plug and the supply plug, and a vent plug positioned on top of the supply plug. Flow deadband is alleviated because the deadband is caused by forces deriving from an end loading, which is a function supply pressure, and the addition of the balance plug adds a force, which is also a function of the supply pressure, to oppose forces from the end loading. The bead chain provides a secure attachment while minimizing opportunity for side loading of the balance plug, which may also produce deadband. The relay may also include a baffle positioned on top of the vent plug for counteracting a back pressure created during venting.

Figure 4:
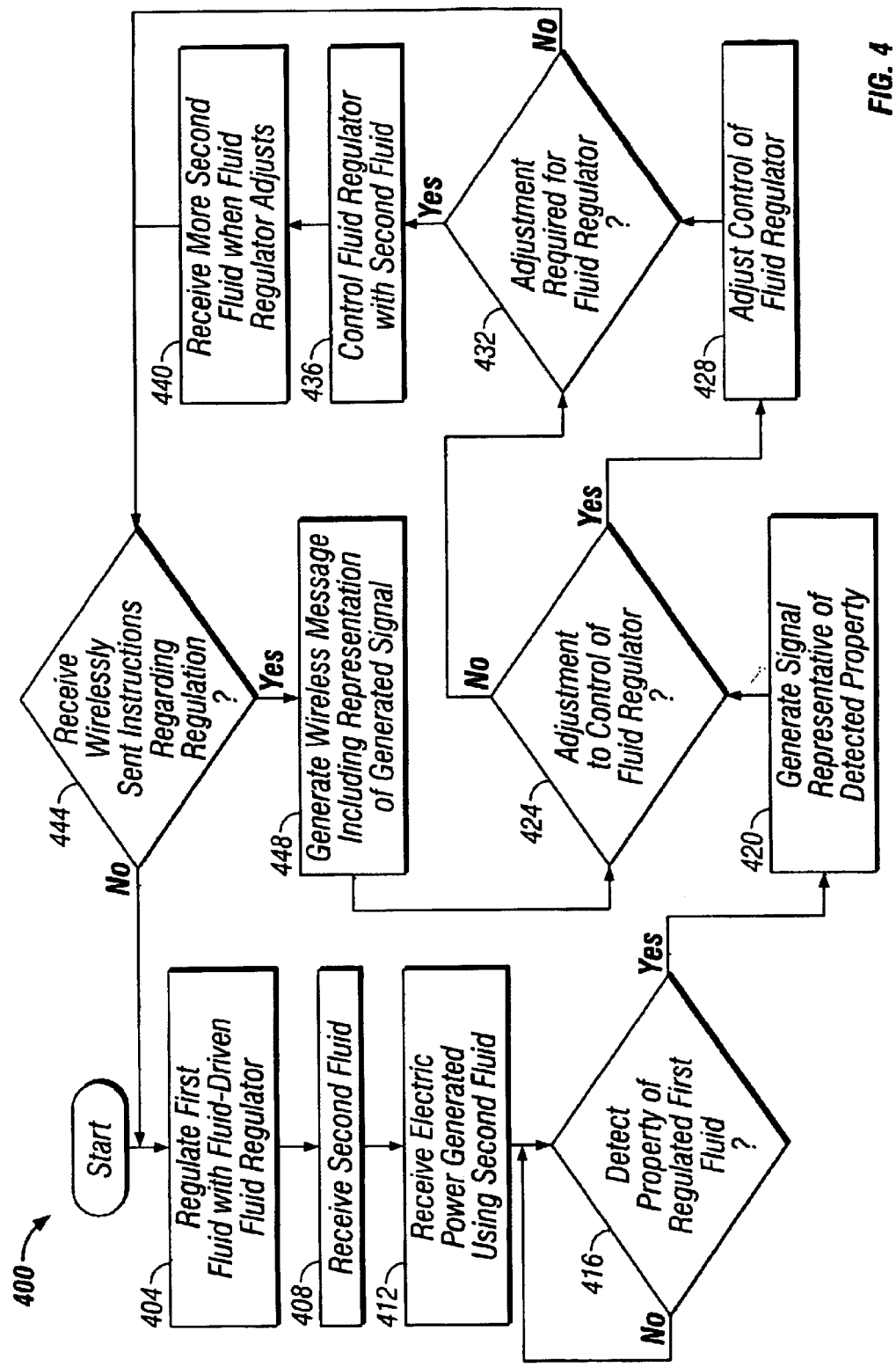
FIG. 4 is a flow chart illustrating a process for fluid regulation.

FIG. 4 illustrates a process 400 for fluid regulation. Process 400 may be implemented by a system composed of a fluid regulator, a controller, and a sensor, which may be similar to those in system 100.

The process begins with regulating a first fluid with a fluid-driven fluid regulator (function block 404). Regulation may, for example, include stopping fluid flow, allowing partial fluid flow, or allowing full fluid flow.

The process also calls for receiving a second fluid (function block 408) and receiving electric power generated using the second fluid (function block 412). The second fluid and the electric power may be from an electric power generator similar to electric power generator 200.

The process continues with determining whether a property of the regulated first fluid has been detected (decision block 416). The fluid property may be temperature, pressure, flow rate, level, or any other appropriate property. In particular implementations, the detections may be made several times per second. If a property of the regulated fluid has been detected, the process calls for generating a signal representative of the detected property (function block 420).

The process continues with determining whether an adjustment to the control of the fluid regulator is required (decision block 424). An adjustment to the control of the fluid regulator may, for example, be required because the regulated fluid does not have a desired property, such as, for example, flow rate. If an adjustment to the control of the fluid regulator is required, the process calls for adjusting the control of the fluid regulator (function block 428). Adjusting the control of the fluid regulator may, for example, include determining that a new position of an actuator of the fluid regulator is required.

Once the control of the fluid regulator has been adjusted, or if an adjustment to the control of the fluid regulator is not required, the process calls for determining whether an adjustment is required for the fluid regulator (decision block 432). An adjustment may, for example, be required if the fluid regulator has not yet attained a desired state (e.g., actuator position).

If an adjustment is required for the fluid regulator, the process calls for controlling the fluid regulator with the second fluid (function block 436). Additionally, the process calls for receiving more second fluid when the fluid regulator is adjusting (function block 440).

Once the fluid regulator has been adjusted, or if an adjustment is not required for the fluid regulator, the process calls for determining whether wirelessly sent instructions regarding regulation have been received (decision block 444). The instructions may have been sent in response to a detected property of the regulated fluid, in response to conditions in fluid regulation systems, because a central facility, perhaps in a polling operation, desires to know the state of the regulated fluid and/or process components, or for any other appropriate condition. If wirelessly sent instructions have been received, the process call for generating a wireless message including a representation of the generated signal (function block 448). In particular implementations, the wireless message may include representations of more than one generated signal. The wireless message may be sent wirelessly subsequently.

The process also calls for determining whether an adjustment to the control of the fluid regulator is required (decision block 424). An adjustment to the control of the fluid regulator may, for example, be required if the instructions include a new set point. If an adjustment to the control of the fluid regulator is required, the process calls for adjusting the control of the fluid regulator (function block 428). If, however, an adjustment to the control of the fluid regulator is not required, the process calls for determining whether an adjustment is required for the fluid regulator (decision block 432).

Although FIG. 4 illustrates a process for fluid regulation, other processes may include fewer, additional, and/or a different arrangement of operations. For example, a process may include generating the electric power using the second fluid. As another example, a process may not include detecting a property of the regulated first fluid and generating the signal representing the detected property. These operations may, for instance, be performed by a different process, in which case the signal may be received by the process, or not at all. As an additional example, a process may not include generating the wireless message including a representation of the generated signal. As a further example, a process may not include determining whether an adjustment to the control of the fluid regulator is required. As another example, a process may not include determining whether wirelessly sent instructions regarding regulation have been received. As an additional example, a process may not have to wait for wireless instructions before wirelessly sending information. For instance, the process may have a time slot in which to send information or may be able to send high priority information (e.g., fire detection or actuator failure) at any time. As a further example, some of the operations may be performed in parallel. For instance, regulating the first fluid, receiving the second fluid, and receiving electric power may be accomplished simultaneously. Furthermore, detecting a property of the regulated fluid and generating a signal representative of the detected property may occur contemporaneously with receiving wireless instructions regarding regulation.

A number of implementations of the invention have been described. Nevertheless, it will be understood that various modifications may be made without departing from the spirit and scope of the invention. Accordingly, other implementations are within the scope of the following claims.

What is claimed is:

1. A system for fluid regulation, the system comprising:
 a fluid-driven fluid regulator operable to regulate a first fluid;
 a fluid supply line operable to supply a second fluid;
 a controller coupled to the supply line and to the fluid regulator, the controller operable to control the fluid regulator using fluid from the supply line;
 a wireless transceiver coupled to the controller, the transceiver operable to wirelessly receive instructions regarding fluid regulation; and
 an electric power generator coupled to the supply line and the controller, the electric power generator operable to generate electric power for the controller and the wireless transceiver using fluid from the supply line.

2. The system of claim 1, wherein the fluid regulator comprises a pneumatically-actuated valve.

3. The system of claim 1, wherein the controller comprises:
 a relay coupled to the supply line and the fluid regulator, the relay controllable to provide fluid from the supply line to the fluid regulator; and
 a microprocessor coupled to the electric power generator to receive electric power therefrom, the microprocessor operable to control the relay.

4. The system of claim 1, wherein the wireless transceiver comprises a radio frequency transceiver.

5. The system of claim 1, wherein the electric power generator comprises an air-powered turbine that generates current.

6. The system of claim 1, further comprising:
 a fluid output conduit coupled to the fluid regulator to transport the regulated first fluid; and
 a sensor coupled to the fluid output conduit and the controller, the sensor operable to detect a property of the fluid in the fluid output conduit and to generate a signal representative of the property.

7. The system of claim 6, wherein the sensor comprises a temperature sensor.

8. The system of claim 6, wherein:
the controller is further operable to generate a wireless message containing a representation of the signal; and
the wireless transceiver is further operable to wirelessly send the wireless message.

9. The system of claim 1, wherein the electric power generator comprises:
a current generator; and
a pressure regulator coupled in parallel with the current generator to the fluid supply line, the pressure regulator supplying more fluid to the controller when the fluid regulator is adjusting.

10. The system of claim 1, further comprising a fluid intake conduit coupled to the fluid regulator, wherein the fluid supply line is coupled to the fluid intake conduit.

11. A system for fluid regulation, the system comprising:
a fluid-driven fluid regulator operable to regulate a first fluid;
a fluid inlet port for a second fluid;
a controller coupled the inlet port and to the fluid regulator, the controller operable to control the fluid regulator with fluid from the inlet port, the controller operable to receive electric power from an electric power generator coupled to a fluid supply line that feeds the fluid inlet port; and
a wireless transceiver coupled to the controller, the transceiver operable to wirelessly receive instructions regarding fluid regulation.

12. The system of claim 11, further comprising:
a fluid output conduit coupled to the fluid regulator to transport the regulated first fluid; and
a sensor coupled to the fluid output conduit and the controller, the sensor operable to detect a property of the fluid in the fluid output conduit and to generate a signal representative of the property.

13. The system of claim 11, further comprising the electric power generator, the electric power generator coupled to the controller and operable to generate electric power for the controller using fluid in a supply line that feeds the inlet port.

14. The system of claim 13, wherein the electric power generator comprises:
a current generator; and
a pressure regulator coupled in parallel with the current generator to a fluid supply line that feeds the inlet port, the pressure regulator supplying more fluid to the controller when the fluid regulator is adjusting.

15. The system of claim 13, further comprising the fluid supply line.

16. A method for fluid regulation, the method comprising:
regulating a first fluid with a fluid-driven fluid regulator;
receiving a second fluid;
receiving electric power generated using the second fluid;
controlling the fluid regulator with the second fluid;
determining whether wirelessly sent instructions regarding regulation have been received; and
if wirelessly sent instructions regarding regulation have been received, adjusting control of the fluid regulator.

17. The method of claim 16, further comprising receiving a signal representative of a property of the regulated first fluid.

18. The method of claim 17, further comprising generating a wireless message comprising a representation of the generated signal.

19. The method of claim 16, further comprising:
detecting a property of the regulated first fluid; and
generating the signal representative of the property.

20. The method of claim 16, wherein the second fluid comprises air.

21. The method of claim 16, further comprising receiving more second fluid when the fluid regulator is adjusting.

22. A system for fluid flow regulation, the system comprising:
means for regulating a first fluid;
means for receiving a second fluid;
means for controlling the regulation means with the second fluid;
means for wirelessly receiving instructions regarding fluid regulation; and
means for generating electric power for the controlling means using the second fluid.

23. The system of claim 22, wherein the controlling means is further operable to receive a signal representative of a property of the regulated first fluid and to generate a wireless message comprising a representation of the generated signal.

24. The system of claim 23, further comprising means for detecting a property of the regulated first fluid and for generating the signal representative of the property.

25. The system of claim 23, wherein the wireless receiving means is further operable to send the wireless message.

26. The system of claim 22, further comprising means for supplying more second fluid when the regulation means is adjusting.

27. A system for fluid regulation, the system comprising:
a fluid intake conduit;
a fluid output conduit;
a pneumatically-actuated valve coupled between the fluid intake conduit and the fluid output conduit;
a pneumatic supply line;
a flow meter coupled to the fluid output conduit and the controller, the flow meter operable to detect flow of the first fluid in the fluid output conduit and to generate signals representative thereof;
a controller coupled to the supply line and to the valve, the controller operable to control the valve and comprising:
a relay coupled between the supply line and the valve, the relay operable to controllably supply fluid from the supply line to the valve,
a current-to-pressure transducer coupled to the relay, the transducer operable to control the relay, and
a microprocessor coupled to the transducer, the microprocessor operable to control the transducer based on the signals from the flow meter;
a wireless transceiver coupled to the controller, the transceiver operable to:
wirelessly receive instructions regarding fluid regulation, and
wirelessly send messages comprising representations of the flow meter signals;
an electric power generator coupled to the supply line, the electric power generator comprising:
a pneumatic turbine operable to generate electric power for the controller and the wireless transceiver using fluid from the supply line, and
a pressure regulator coupled in parallel with turbine to the supply line, the pressure regulator supplying more fluid to the controller when the valve is stroking.

* * * * *

UNITED STATES PATENT AND TRADEMARK OFFICE
CERTIFICATE OF CORRECTION

PATENT NO. : 6,917,858 B2 Page 1 of 1
APPLICATION NO. : 10/651396
DATED : July 12, 2005
INVENTOR(S) : Henry W. Boger It is certified that error appears in the above-identified patent and that said Letters Patent is hereby corrected as shown below:

Col. 5, line 44 - after "relay," replace "a" with --an--.

Col. 6, line 50 - replace "generator" with --generate--.

Col. 6, lines 65-66 - move "FIG. 1 illustrates a system for fluid regulation," to appear after "Although."

Col. 8, line 10 - after "may," insert --be--.

Signed and Sealed this

Fifth Day of February, 2008

JON W. DUDAS
*Director of the United States Patent and Trademark Office*